Dec. 1, 1953 C. E. McCORMICK 2,661,051
TRIM FASTENING MEANS FOR VEHICLE SEATS
Filed Dec. 20, 1948 3 Sheets-Sheet 1
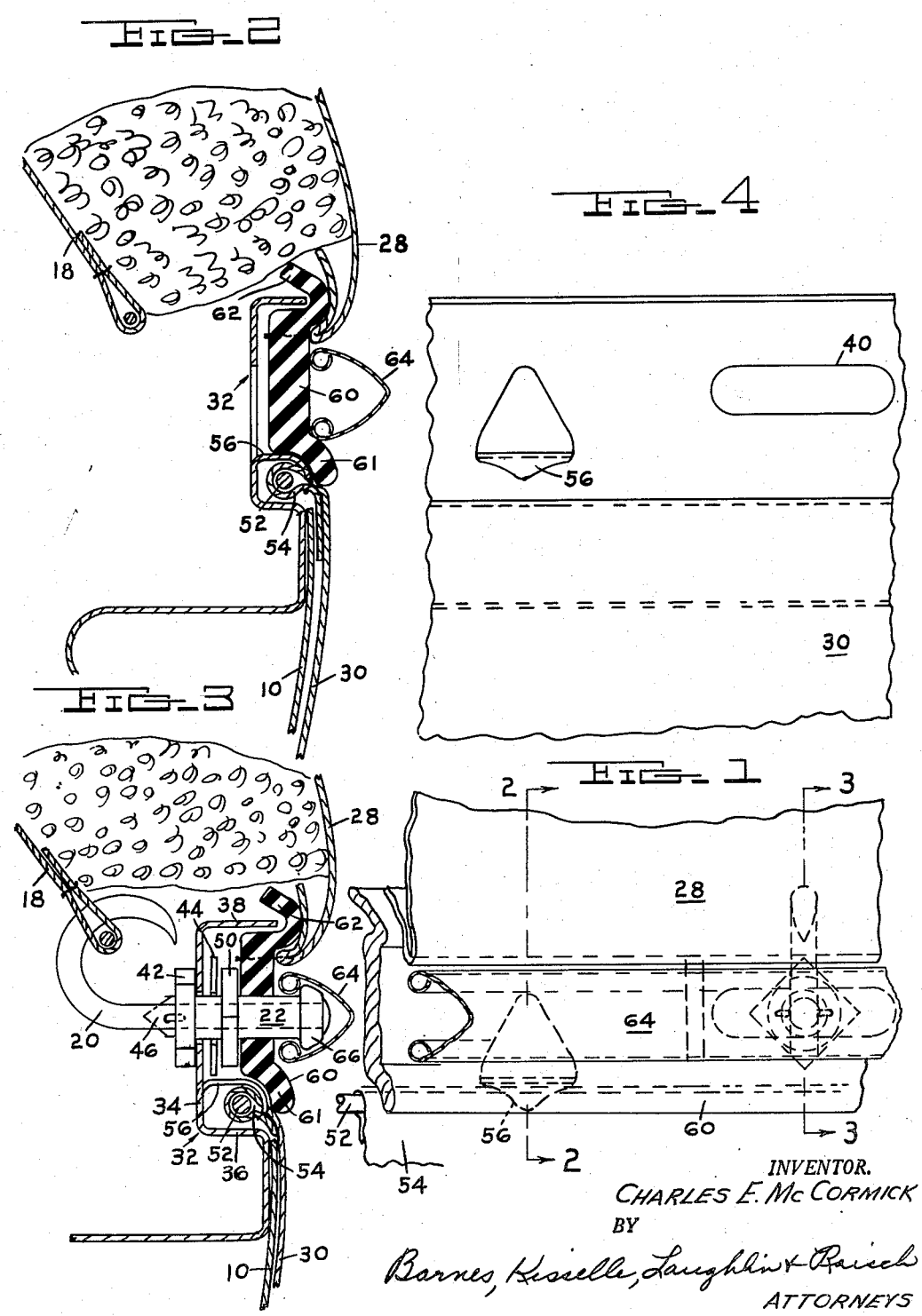
INVENTOR.
CHARLES E. McCORMICK
BY
Barnes, Kisselle, Laughlin & Raisch
ATTORNEYS Dec. 1, 1953     C. E. McCORMICK     2,661,051
TRIM FASTENING MEANS FOR VEHICLE SEATS
Filed Dec. 20, 1948     3 Sheets-Sheet 2
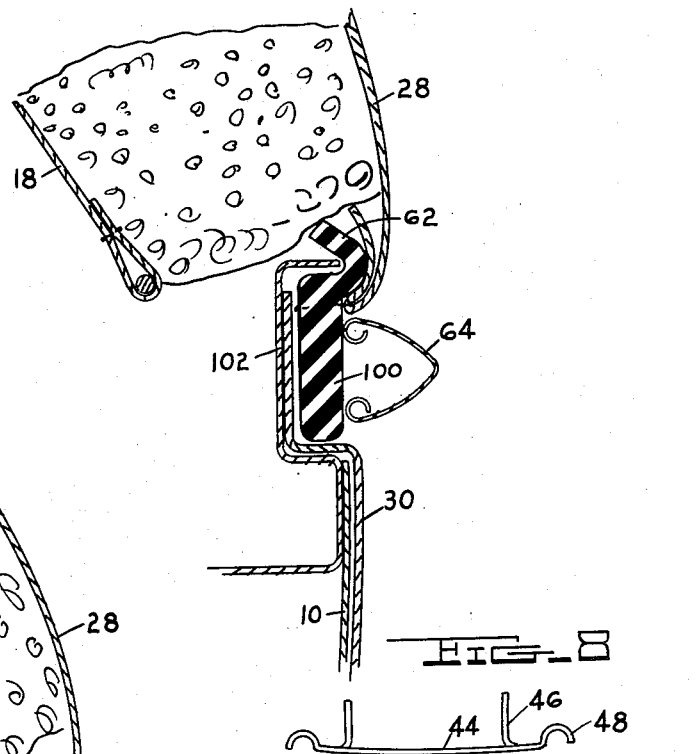
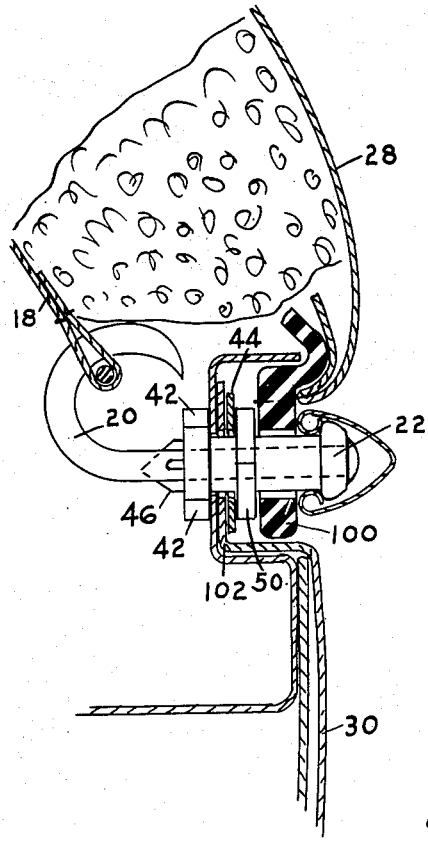
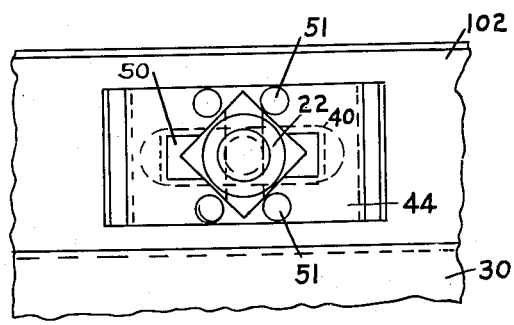
INVENTOR.
CHARLES E. McCORMICK
BY
Barnes, Kisselle, Laughlin & Raisch
ATTORNEYS Dec. 1, 1953 C. E. McCORMICK 2,661,051
TRIM FASTENING MEANS FOR VEHICLE SEATS
Filed Dec. 20, 1948 3 Sheets-Sheet 3
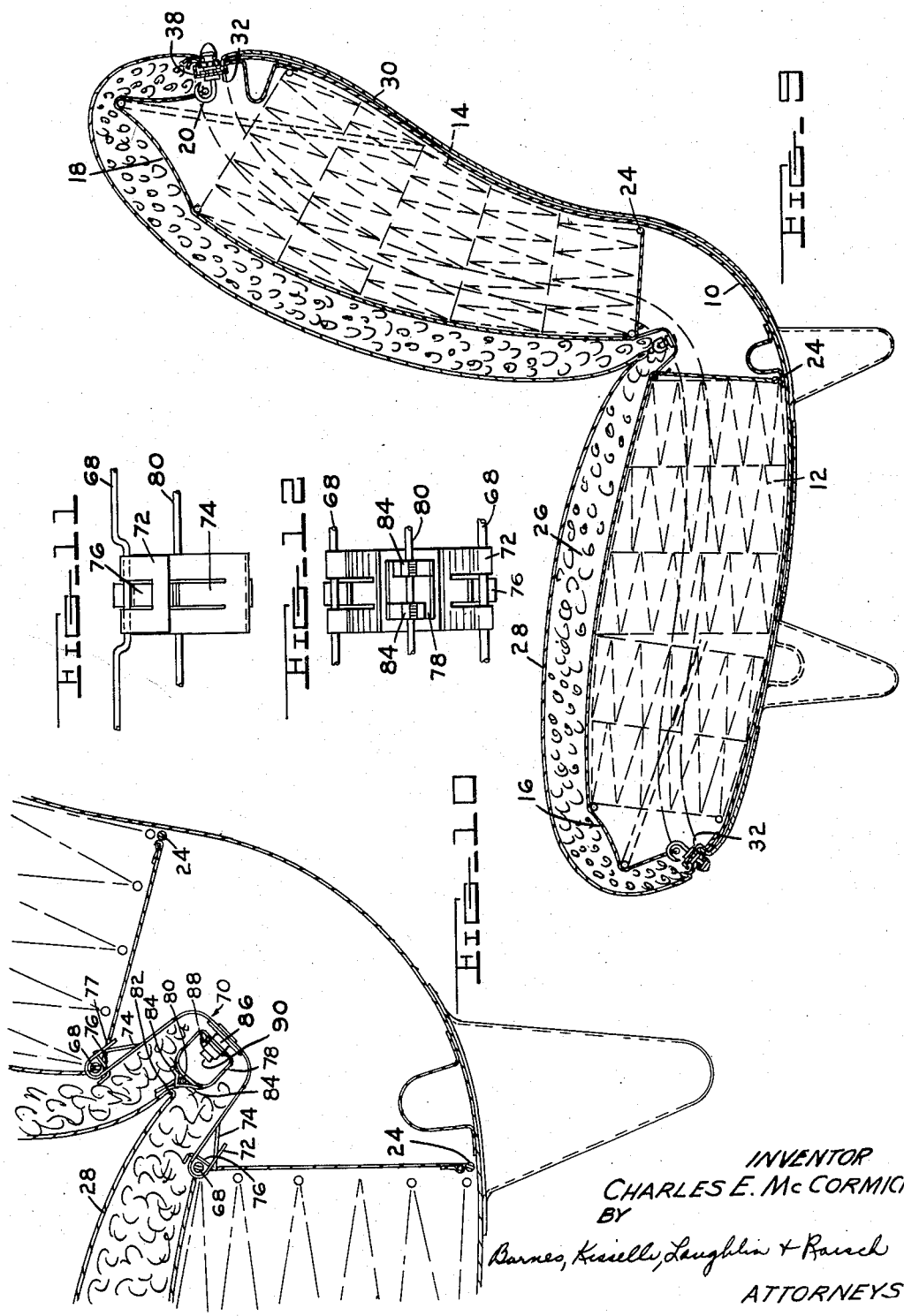
INVENTOR
CHARLES E. McCORMICK
BY
Barnes, Kisselle, Laughlin & Rausch
ATTORNEYS Patented Dec. 1, 1953

2,661,051

UNITED STATES PATENT OFFICE 2,661,051

TRIM FASTENING MEANS FOR VEHICLE SEATS

Charles E. McCormick, Dearborn, Mich.

Application December 20, 1948, Serial No. 66,178

8 Claims. (Cl. 155—180)

This invention relates to trim fastening means for vehicle seats and more particularly to a one piece trim cover and the fastening means therefor.

In my copending application, Serial No. 705,390, filed October 24, 1946, now abandoned, there is disclosed a one piece trim cover and fastening means in the form of a rubber molding sewn around the edge of the cover, the molding being reinforced with a wire inserted therein and being perforated at spaced points for engagement with correspondingly spaced studs secured around the edge of the seat pan. The molding is held in place on the studs and is concealed by a finish channel-shaped molding which snaps over the enlarged heads of the studs. Although that construction has proven generally successful, its attractiveness depends upon the stiffness of the wire insert to hold the peripheral edge of the cover in a smooth line without a scalloping effect between the studs. Another objectionable feature is that insertion of the wire in the rubber molding when assembling and removal of the wire therefrom for cleaning the cover has proved to be both bothersome and expensive.

It is an object of this invention to provide a fastening means for the cushion trim cover of a vehicle seat which includes an edge molding sewn around the edge of the trim cover but which is shaped to engage with a flange on the seat pan such that the tension of the fabric is resisted by the flange uniformly along the molding instead of at localized points along the molding. I have found that with my improved construction there is no need for the provision of a rigid reinforcing wire within the edge molding and that the seat can be produced more economically.

Another object of the invention is to provide a trim fastening construction which enables the removal and replacement of an outer trim cover on the outer back and side surfaces of the seat pan, that is, a trim cover which extends around the back, sides, and a portion of the bottom of the seat.

A further object of the invention resides in the provision of an improved fastening device for anchoring the trim cover for the seat cushion supporting surfaces along the mid-line between the horizontal and vertical supporting surfaces.

In the drawings:

Figure 1 is a fragmentary view of the seat constructed in accordance with this invention showing a portion of the seat along the upper rear edge of the seat pan.

Figure 2 is a sectional view taken along lines 2—2 in Figure 1.

Figure 3 is a sectional view taken along lines 3—3 in Figure 1.

Figure 4 is a fragmentary view of an edge portion of the seat pan taken at a point corresponding to Figure 1 before the trim cover and trim fastening means are secured thereto.

Figure 5 is a fragmentary view of an edge portion of the seat pan before the trim cover for the seat is applied and showing an alternate method of attaching the outer trim cover to the seat pan.

Figure 6 is a fragmentary cross section of the modified form of construction shown in Figure 5 taken through a point corresponding to the position of one of the stud members.

Figure 7 is a sectional view similar to Figure 6 but taken at a point spaced from the stud members.

Figure 8 is a side view of the spring washer utilized for securing the studs in place along the edge of the seat pan.

Figure 9 is a cross section of the completely assembled seat of this invention.

Figure 10 is a sectional view on an enlarged scale showing a portion of the structure in Figure 9 in greater detail.

Figure 11 is a side view of the spring fastener utilized for anchoring the trim cover along the mid-line between the back and bottom spring units.

Figure 12 is a top view of the fastener assembly shown in Figure 11.

Referring to the drawings and particularly to Figure 9 there is shown a seat which comprises a sheet metal seat pan 10 having the general contour illustrated and in which are positioned a horizontal spring unit 12 and a vertical spring unit 14. The spring units may be mounted in the seat pan by any suitable means which support the springs in their desired relative position. Each of the spring units is provided with a spring cover. Spring cover 16 extends over spring unit 12 and cover 18 extends over spring unit 14. Covers 16 and 18 are secured around their outer edges to the edges of the seat pan by engagement with the hook portions 20 of studs 22 which are secured around the edge of the seat pan. Along the adjacent inner edges of the spring units covers 16 and 18 extend downwardly over the upper rims of the spring units and are secured to the bottom rims of the spring units as shown at 24. A pad 26 overlies both the spring covers. Pad 26 is composed of the usual cotton padding covered with cheese cloth or the like.

The seat is finished on its outer surface with two trim covers 28 and 30. Trim cover 28 overlies pad 26 and trim cover 30 extends over the outer surface of the seat pan, that is, around the back, bottom and sides of the pan. These trim covers are secured to the seat pan by the novel means which will now be described. Around the peripheral edge of seat pan 10 there is welded or otherwise secured a channel member 32 which is preferably shaped and positioned so that the base portion 34 thereof is offset inwardly of the edge of the seat pan. Channel member 32 is formed with a flange 36 along its inner edge by which the channel is anchored to the seat pan and a flange 38 along the free edge of the channel. The base portion 34 of channel 32 is provided with a plurality of uniformly spaced elongated apertures 40 through which the hook portions 20 of studs 22 are adapted to be inserted. Stud 22 is provided with an elongated lug or shoulder portion 42 on its shank which is adapted to be inserted through slot 40 and engaged with the back surface of the base portion 34 when the stud is turned 90° so that the lug 42 is disposed crosswise to slot 40. The stud is held in the position shown by means of a spring washer 44 having spaced fingers 46 extending through and engaged by slots 40 and upturned spring portions 48 at each end thereof which seat against the base portion 34 of channel 32 when the clip is arranged in the channel with fingers 46 projecting through slots 40. When the stud 22 is inserted through spring clip 44 and slots 40, hook portion 20 foremost, and turned 90° so that the plane of the hook portion 20 extends transversely of the axis of channel 32, spring clip 44 is flexed at its central portion by a flange portion 50 on stud 22 so that the elongated lug 42 is pulled up tight against the back face of channel 32. Lug 42 and flange 50 are spaced apart on the shank of stud 20 so that the spring clip 44 is flexed about the upturned ends 48 when the stud is turned to the operative position. The stud 22 is thereby retained in place under a spring tension, and by the detents 51 formed on the outer face of clip 44, which detents are spaced to engage the edges of the square shaped flange 50 as is shown in Fig. 5.

In the form of invention shown in Figures 1 through 4 the back trim cover 30 which extends around the back and bottom of the seat pan is reinforced around its peripheral edge with a wire 52. The wire is retained within a hemmed portion 54 around the edge of cover 30. Cover 30 is secured on the seat pan 10 by means of metal tabs 56 which are struck out from the base portion 34 of channel 32 and turned over the wire 52 so as to firmly retain the hemmed portion 54 within the channel 32. Whenever it is desired to remove or replace trim cover 30 the metal tabs 56 are simply straightened out so as to permit withdrawal of the hemmed portion 54 from within the channel 32. The front trim cover 28 which extends over the supporting surface of the seat has sewn around its peripheral edge of flexible molding 60 which is preferably made of rubber or plastic. Molding 60 is perforated for engagement with studs 22 and is dimensioned so as to fit within channel 32. Along one edge molding 60 is fashioned to provide a flange 61 which conceals tabs 56 and the wired edge of cover 30. Along its other edge the molding is provided with a flange portion 62 of angular cross section which fits over flange 38 of channel 32. Edge molding 60 is held in place on studs 22 by means of a channel shaped finish molding 64 which snaps over the enlarged heads 66 at the outer ends of studs 22 and bears against the outer face of the molding 60. The hook portions 20 of studs 22 serve as a means for anchoring the outer edges of spring covers 16 and 18.

The upper wire rims 68 of spring units 12 and 14 are secured together along their adjacent sides by a plurality of strips formed as U-shaped spring fasteners 70. The upper end of each leg of fastener 70 is provided with a return bend portion 72. The central portion of each leg of clip 70 is bent outwardly as at 74 and then transversely inwardly and upwardly as at 76 so as to provide laterally offset fingers which cooperate with the return bend portion 72 to engage the upper rims 68 of spring units 12 and 14. The fastener 70 is adapted to be engaged with the rims 68 by merely positioning the fastener so that the rims 68 are arranged at each side of the fastener between the legs of the fastener and the lower ends of the return bend portions 72. The fastener is then depressed so that the spring fingers 74 are flexed inwardly by the rims until the rims reach the upper end of the return bend portions 72 at which point the fingers 74 snap outwardly and hold the fastener on the rims. When it is desired to disengage fasteners 70 from the spring units the spring fingers 74 are flexed inwardly so as to clear the rims 68, thereby permitting the fastener to be withdrawn. The fabric trim cover 28 is anchored to fastener 70 by means of clip member 78. These clips are secured to the trim cover 28 by means of a wire 80 inserted within a hemmed portion 82 sewn on the inner face of the cover. Clip 78 is fashioned at its upper end with a pair of spring fingers 84 which are spaced apart and have their free ends extending in opposite directions. To engage the clip with wire 80 the clip is positioned against bared portions of the wire with fingers 84 straddling the wire and the clip is then twisted 90° so as to engage the wire under each of the fingers. At its lower end clip 78 is arranged to be inserted over an upwardly projecting stud 86 secured to the base of fastener 70 and having a spring catch 88 thereon which engages with clip 78 so as to prevent the clip from being withdrawn from the stud. Spring catch 88 is arranged to be retracted to permit the removal of the clip 78 from stud 86 by means of a push button 90 on the upper end of stud 86.

In the modified form of invention shown in Figures 5 through 8 the front trim cover 28 is secured on the seat in a manner similar to that previously described by means of an edge molding 100 but the fabric cover 30 is attached to the seat pan by cementing its edge within the channel member 102. Channel 102 is accordingly narrower than channel 32 described with reference to the previous embodiment of the invention and the edge molding 100 is shaped to fit nicely within channel 102. This latter method of attaching the fabric trim cover 30 is preferably utilized when it is desired to attach the outer trim cover on the back and sides of the seat pan in a permanent manner.

It will thus be seen that I have provided trim fastening means for a vehicle seat which enable the trim covers to be quickly removed or replaced on the seat at will. The use of the edge molding around the edge of the cushion trim cover and the provision of a flange around the edge of the seat pan against which the edge molding is shouldered distributes the tension of the fabric uniformly and holds the edge of the cushion trim cover in a smooth line. This arrangement also eliminates the necessity for the provision of a reinforcing wire within the molding.

What I claim is:

1. In a vehicle seat of the type having a base with a vertical and a horizontal spring unit of generally rectangular shape supported on said base so that the rear edge of the supporting surface of the horizontal spring unit extends transversely of the seat and is spaced closely adjacent the lower edge of the supporting surface of the vertical spring unit, the combination of a trim cover extending over the supporting surfaces of said horizontally and vertically positioned spring units, said spring units each being provided with a peripheral rim around the edge of the supporting surface thereof, fastening means extending across and detachably connecting in spaced relation the adjacent transversely extending runs of said rims at the juncture of said vertical and horizontal spring units, said fastening means having a portion extending downwardly between the adjacent sides of said two spring units, said trim cover having a reinforced hem portion on the inner face thereof positioned to correspond with the mid-line between said adjacent runs of said two rims, clip members suspended on said reinforced hem portion and detachably engaged with said portion of said fastening means at a point below the supporting surfaces of said spring units so as to pull said hem portion down between the adjacent sides of said spring units, and means around the peripheral edge of said base for detahably securing the edge of said trim cover thereto.

2. In a vehicle seat of the type having a base with a vertical and a horizontal spring unit of generally rectangular shape supported on said base so that the rear edge of the supporting surface of the horizontal spring unit extends transversely of the seat and is spaced closely adjacent the lower edge of the supporting surface of the vertical spring unit, the combination of a trim cover extending over the supporting surfaces of said horizontally and vertically positioned spring units, said spring units each having a peripheral rim around the edge of the supporting surface thereof and being positioned on said base so that the adjacent transversely extending runs of said two rims at the juncture of said two spring units are spaced apart, a plurality of U-shaped fasteners having resilient clip portions adjacent the ends of the legs of said fasteners detachably engaged with said adjacent runs of said rims and connecting said rims in spaced relation, said trim cover having a hem portion on the inner face thereof positioned to correspond with the mid-line between said adjacent runs of said rims, a relatively rigid wire inserted within said hem portion, spring clips detachably engaged with said wire, said U-shaped fasteners having upwardly projecting studs at the base thereof with which said spring clips are detachably engaged, said U-shaped fasteners and said spring clips being positioned such that the hem portion of said trim cover is drawn down between the adjacent sides of said two spring units, and means for detachably securing the peripheral edge of said trim cover to said base.

3. The combination as set forth in claim 2 wherein each leg of said U-shaped fastener is fashioned with a return bend at its upper end extending over a portion of said rims and with a laterally offset portion having a flange extending transversely of the leg below said return bend and cooperating with said return bend so as to engage said rim therebetween, said laterally offset portions being resilient in a direction transversely of said legs to permit shifting said flanges out of engagement with said rims.

4. In a vehicle seat having a base with generally vertical and horizontal spring units of generally rectangular shape supported on said base so that the rear edge of the supporting surface of said horizontal spring unit extends transversely of the seat and is spaced from the lower edge of the supporting surface of the vertical spring unit, the combination of a trim cover extending continuously over the supporting surfaces of both of said spring units, said spring units each being provided with a reinforcing peripheral rim around the edge of the supporting surface thereof, strap means extending across the adjacent transversely extending runs of said rims, said strap means being connected at opposite ends of said runs of said rims to retain said runs in spaced relation, said trim cover having a flap on the underside thereof positioned to correspond generally with the mid-line between the adjacent sides of said two spring units, and detachable clip members connecting said flap with said strap members.

5. In a vehicle seat having a base with generally vertical and horizontal spring units of generally rectangular shape supported on said base so that the rear edge of the supporting surface of said horizontal spring unit extends transversely of the seat and is spaced from the lower edge of the supporting surface of the vertical spring unit, the combination of a trim cover extending continuously over the supporting surfaces of both of said spring units, said spring units each being provided with a reinforcing peripheral rim around the edge of the supporting surface thereof, strap members extending across the adjacent transversely extending runs of said rims, said strap members being connected at opposite ends to said runs of said rims to retain said transversely extending runs of said rims in spaced relation, said trim cover having a flap on the underside thereof positioned to correspond generally with the mid-line between said adjacent sides of said two spring units, and cooperating detachable fastening members on said flap and said strap members for anchoring said flap on said strap members, said flap, strap members and fastening members being dimensioned and arranged to pull said trim cover smoothly over the supporting surfaces of said spring units.

6. The combination set forth in claim 5 wherein said fastening members comprise upstanding studs on said strap members provided with spring detents at the free end thereof and clip members on said flap arranged to be inserted over the free ends of said studs and engaged by said spring detents.

7. The combination set forth in claim 5 wherein said strap members are U-shaped, the legs of said U-shaped strap members being detachably connected at their free ends with said adjacent runs of said rims, the bite portion of said U-shaped straps depending downwardly between said spring units and supporting the fastening members on said straps.

8. In a vehicle seat having a base with generally vertical and horizontal spring units of generally rectangular shape supported on said base so that the rear edge of the supporting surface of said horizontal spring unit extends transversely of the seat and is spaced from the lower edge of the supporting surface of the vertical spring unit, the combination of a trim cover extending over the supporting surfaces of both of said spring units, the adjacent edges of said supporting surfaces at the juncture between said spring units being spaced apart, strap means extending across and connecting said adjacent edges in said spaced relation, said trim cover having fastening means on the underside thereof extending along a line corresponding generally with the mid-line between the adjacent sides of said two spring units, and fastening means on said strap means adapted to detachably connect with said fastening means on the underside of said cover.

CHARLES E. McCORMICK.

References Cited in the file of this patent

UNITED STATES PATENTS

| Number | Name | Date |
| --- | --- | --- |
| 941,875 | Henry | Nov. 30, 1909 |
| 1,188,407 | Buch | June 27, 1916 |
| 1,221,748 | Kohler | Apr. 3, 1917 |
| 1,369,940 | Silvester | Mar. 1, 1921 |
| 1,486,296 | Olson | Mar. 11, 1924 |
| 2,109,652 | Sallop et al. | Mar. 1, 1938 |
| 2,120,036 | Northup | June 7, 1938 |
| 2,268,765 | Monroe | Jan. 6, 1942 |
| 2,352,938 | Caughey | July 4, 1944 |

FOREIGN PATENTS

| Number | Country | Date |
| --- | --- | --- |
| 499,162 | Great Britain | Jan. 19, 1939 |